United States Patent
Yamada et al.

(10) Patent No.: US 8,657,364 B2
(45) Date of Patent: Feb. 25, 2014

(54) REAR STRUCTURE OF A VEHICLE BODY

(75) Inventors: Masakazu Yamada, Aikawa-machi (JP); Takayoshi Nomura, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 695 days.

(21) Appl. No.: 12/418,502

(22) Filed: Apr. 3, 2009

(65) Prior Publication Data

US 2009/0278384 A1 Nov. 12, 2009

(30) Foreign Application Priority Data

May 9, 2008 (JP) ................................. 2008-123423
Feb. 17, 2009 (JP) ................................. 2009-033710

(51) Int. Cl.
*B60J 7/00* (2006.01)

(52) U.S. Cl.
USPC ................................................... 296/187.11

(58) Field of Classification Search
USPC ............................................. 296/197.11, 204
See application file for complete search history.

(56) References Cited

U.S. PATENT DOCUMENTS

| | | | | |
|---|---|---|---|---|
| 2,195,688 | A * | 4/1940 | Windberger | 296/37.2 |
| 2,823,068 | A * | 2/1958 | Walker | 296/37.2 |
| 3,595,335 | A * | 7/1971 | Wessells et al. | 296/187.09 |
| 3,848,886 | A * | 11/1974 | Feustel et al. | 280/784 |
| 3,870,341 | A * | 3/1975 | Younger | 280/423.1 |
| 3,912,295 | A * | 10/1975 | Eggert, Jr. | 280/784 |
| 4,060,270 | A * | 11/1977 | Croissant | 296/37.2 |
| 4,423,900 | A * | 1/1984 | Sugimoto et al. | 296/37.14 |
| 4,514,008 | A * | 4/1985 | Watanabe et al. | 296/204 |
| 4,958,870 | A * | 9/1990 | Carter | 293/106 |
| 5,018,780 | A * | 5/1991 | Yoshii et al. | 296/203.04 |
| 5,110,177 | A * | 5/1992 | Akio | 296/187.11 |
| 5,114,184 | A * | 5/1992 | Shimomura et al. | 280/784 |
| 5,381,871 | A * | 1/1995 | Ohta | 180/296 |
| 5,419,609 | A * | 5/1995 | Kmiec et al. | 296/187.11 |
| 5,429,388 | A * | 7/1995 | Wheatley et al. | 280/784 |
| 5,605,371 | A * | 2/1997 | Borchelt et al. | 296/187.09 |

(Continued)

FOREIGN PATENT DOCUMENTS

| | | |
|---|---|---|
| CN | 1724293 A | 1/2006 |
| CN | 1751938 A | 3/2006 |

(Continued)

OTHER PUBLICATIONS

Office Action in European Application No. 09159599.1-1268, dated Jun. 4, 2010 (3 pages).

(Continued)

*Primary Examiner* — Kiran B Patel
(74) *Attorney, Agent, or Firm* — Osha Liang LLP (57) ABSTRACT

A rear structure of a vehicle body includes a first rear side member and a second rear side member, the first and second rear side members generally extending in a front-to-rear direction of the vehicle body, a first rear cross member extending between the first rear side member and the second rear side member, a rear center member extending from the first rear cross member toward the rear of the vehicle body in the front-to-rear direction, and wherein the rear center member includes at least one structure configured to be vulnerable when an impact load is exerted upon the rear of the vehicle body.

20 Claims, 6 Drawing Sheets

(56) References Cited

U.S. PATENT DOCUMENTS

| | | | | |
|---|---|---|---|---|
| 5,788,322 | A | * | 8/1998 | Wolf et al. .................. 296/181.4 |
| 5,829,824 | A | * | 11/1998 | Yamamuro et al. ........... 296/204 |
| 5,853,195 | A | * | 12/1998 | Le et al. ........................ 280/784 |
| 5,860,687 | A | * | 1/1999 | Corporon et al. ............ 296/37.2 |
| 6,003,934 | A | * | 12/1999 | Usui ....................... 296/203.02 |
| 6,422,604 | B2 | * | 7/2002 | Lapic ............................. 280/784 |
| 6,655,896 | B2 | * | 12/2003 | Morin et al. .................. 414/463 |
| 6,672,639 | B2 | * | 1/2004 | Kosuge et al. ............... 296/37.2 |
| 6,676,183 | B2 | * | 1/2004 | Yoshida et al. ................. 296/30 |
| 6,688,676 | B1 | * | 2/2004 | Sato ......................... 296/187.05 |
| 6,830,287 | B1 | * | 12/2004 | Aghssa et al. ............ 296/187.11 |
| 6,951,366 | B2 | * | 10/2005 | Tomita ..................... 296/187.08 |
| 7,270,365 | B2 | * | 9/2007 | Suzuki et al. ............ 296/187.08 |
| 7,380,856 | B2 | * | 6/2008 | Kobayashi et al. ........... 296/37.2 |
| 7,389,860 | B2 | * | 6/2008 | Abu-Odeh et al. ........... 188/377 |
| 7,429,076 | B2 | * | 9/2008 | Asahi et al. .............. 296/203.04 |
| 7,448,673 | B2 | * | 11/2008 | Yasuhara ................. 296/187.09 |
| 7,527,327 | B2 | * | 5/2009 | Aghssa et al. ........... 296/203.04 |
| 7,540,559 | B2 | * | 6/2009 | Egawa et al. ............ 296/203.04 |
| 7,614,684 | B2 | * | 11/2009 | Yasuhara et al. ......... 296/187.09 |
| 7,631,918 | B2 | * | 12/2009 | Yasukouchi et al. ............ 296/30 |
| 7,677,651 | B2 | * | 3/2010 | Yamaguchi et al. ..... 296/203.04 |
| 7,699,346 | B2 | * | 4/2010 | Wehner et al. ................. 280/784 |
| 7,717,496 | B2 | * | 5/2010 | Ebina et al. ............. 296/187.12 |
| 7,731,257 | B2 | * | 6/2010 | Venuto et al. ................. 296/37.2 |
| 7,784,858 | B2 | * | 8/2010 | Abe et al. ................. 296/203.04 |
| 7,905,541 | B2 | * | 3/2011 | Yamaguchi et al. ..... 296/203.04 |
| 7,950,724 | B2 | * | 5/2011 | Yamaguchi et al. ..... 296/187.11 |
| 7,954,887 | B2 | * | 6/2011 | Sakamoto et al. ....... 296/193.08 |
| 2006/0061142 | A1 | * | 3/2006 | Kobayashi et al. ...... 296/203.04 |
| 2010/0231002 | A1 | * | 9/2010 | Yoshioka et al. ........ 296/187.12 |
| 2010/0237659 | A1 | * | 9/2010 | Ishigame et al. .............. 296/204 |

FOREIGN PATENT DOCUMENTS

| | | |
|---|---|---|
| CN | 1968839 A | 5/2007 |
| DE | 19913532 | 9/1999 |
| EP | 0968904 | 1/2000 |
| FR | 2866619 | 8/2005 |
| JP | 7-7265 | 2/1995 |
| JP | 2002-274194 A | 9/2002 |
| JP | 2002-321642 A | 11/2002 |

OTHER PUBLICATIONS

Chinese Office Action in Chinese Patent Application No. 200910132298.0, dated Nov. 22, 2011, (5 pages).
Office Action in Korean Application No. 10-2009-0039983, dated Aug. 31, 2010 (4 pages).
English Patent Abstract of JP2002321642 from esp@cenet, published Nov. 5, 2002 (1 page).
English Patent Abstract of JP2002274194 from esp@cenet, published Sep. 25, 2002 (1 page).
European Search Report for European Application No. 09159599.1-1268, dated Oct. 20, 2009 (6 pages).
English Patent Abstract of EP0968904 from esp@cenet, published Jan. 5, 2000 (1 page).
English Patent Abstract of DE19913532 from esp@cenet, published Sep. 30, 1999 (1 page).
English Patent Abstract of FR2866619 from esp@cenet, published Aug. 26, 2005 (1 page).
Partial Mechanical English translation of Japanese Laid-Open Utility Model Publication No. 7-7265, published Feb. 22, 1995 (4 pages).
Office Action in Chinese Application No. 200910132298, dated Apr. 11, 2012 (7 pages).

* cited by examiner

REAR STRUCTURE OF A VEHICLE BODY

CROSS-REFERENCE TO RELATED APPLICATIONS

The present application claims priority from Japanese Patent Application No. 2008-123423, filed May 9, 2008 and Japanese Patent Application No. 2009-033710, filed Feb. 17, 2009. The contents of both priority applications are hereby incorporated by reference in their entirety.

BACKGROUND OF THE DISCLOSURE

1. Field of the Disclosure

The present disclosure generally relates to a rear structure of a vehicle body, and more particularly to a technique for absorbing a rear impact.

2. Description of the Related Art

Japanese Laid-Open Utility Model Publication No. 7-7265 ("Patent Document 1") discloses a technique for absorbing an impact energy. In this technique, a plurality of embosses are formed in rear side members, which are extended toward a rear direction of a vehicle and disposed at right and left sides. As such, when an impact load from a rear portion of the vehicle is exerted to a rear end of the rear side member, the embosses are compressed and destroyed. This causes the rear side member to buckle, which absorbs the impact energy.

However, in the technique disclosed in Patent Document 1, the impact load is received by only the rear side member at one side when there is an offset collision (i.e., when the impact load is exerted to the rear potion of the vehicle while being offset to any one side in a width direction of the vehicle). As such, in Patent Document 1, because the rear side member does not buckle but rather bends toward an inner or outer side of the vehicle, the impact energy cannot be sufficiently absorbed. In particular, it is difficult to sufficiently absorb the rear impact energy for a vehicle in a short overhang type having a short length from the rear portion of a cabin of the vehicle to the rear end of the rear side member.

SUMMARY OF THE CLAIMED SUBJECT MATTER

In one aspect, embodiments disclosed herein relate to a rear structure of a vehicle body including a first rear side member and a second rear side member, the first and second rear side members generally extending in a front-to-rear direction of the vehicle body, a first rear cross member extending between the first rear side member and the second rear side member, a rear center member extending from the first rear cross member toward the rear of the vehicle body in the front-to-rear direction, and wherein the rear center member comprises at least one structure configured to be vulnerable when an impact load is exerted upon the rear of the vehicle body.

In another aspect, embodiments disclosed herein relate to a rear structure of a vehicle body including a first rear side member and a second rear side member, the first and second rear side members generally extending in a front-to-rear direction of the vehicle body, a first rear cross member extending between the first rear side member and the second rear side member, a rear center member extending from the first rear cross member toward the rear of the vehicle body in the front-to-rear direction, and wherein the rear center member comprises a means for collapsing configured to be crushed when an impact load is exerted upon the rear of the vehicle body.

In another aspect, embodiments disclosed herein relate to a method to absorb an impact to a rear structure of a vehicle body including disposing first and second rear side members in a front-to-rear direction to the vehicle body, extending a first rear cross member between the first and second rear side members, extending a rear center member from the first rear cross member toward the rear of the vehicle body in the front-to rear direction, and providing at least one crushable portion to the rear center member, wherein the at least one crushable portion is configured to be crushed by an impact load applied to the rear structure of the vehicle body.

BRIEF DESCRIPTION OF DRAWINGS

Features of the present disclosure will become more apparent from the following description in conjunction with the accompanying drawings.

DETAILED DESCRIPTION

Hereinafter, embodiments of the present disclosure will be explained in detail with reference to the drawings.

FIGS. 1 to 7 illustrate a rear structure of a vehicle body according to embodiments of the present disclosure.

Figure 2:
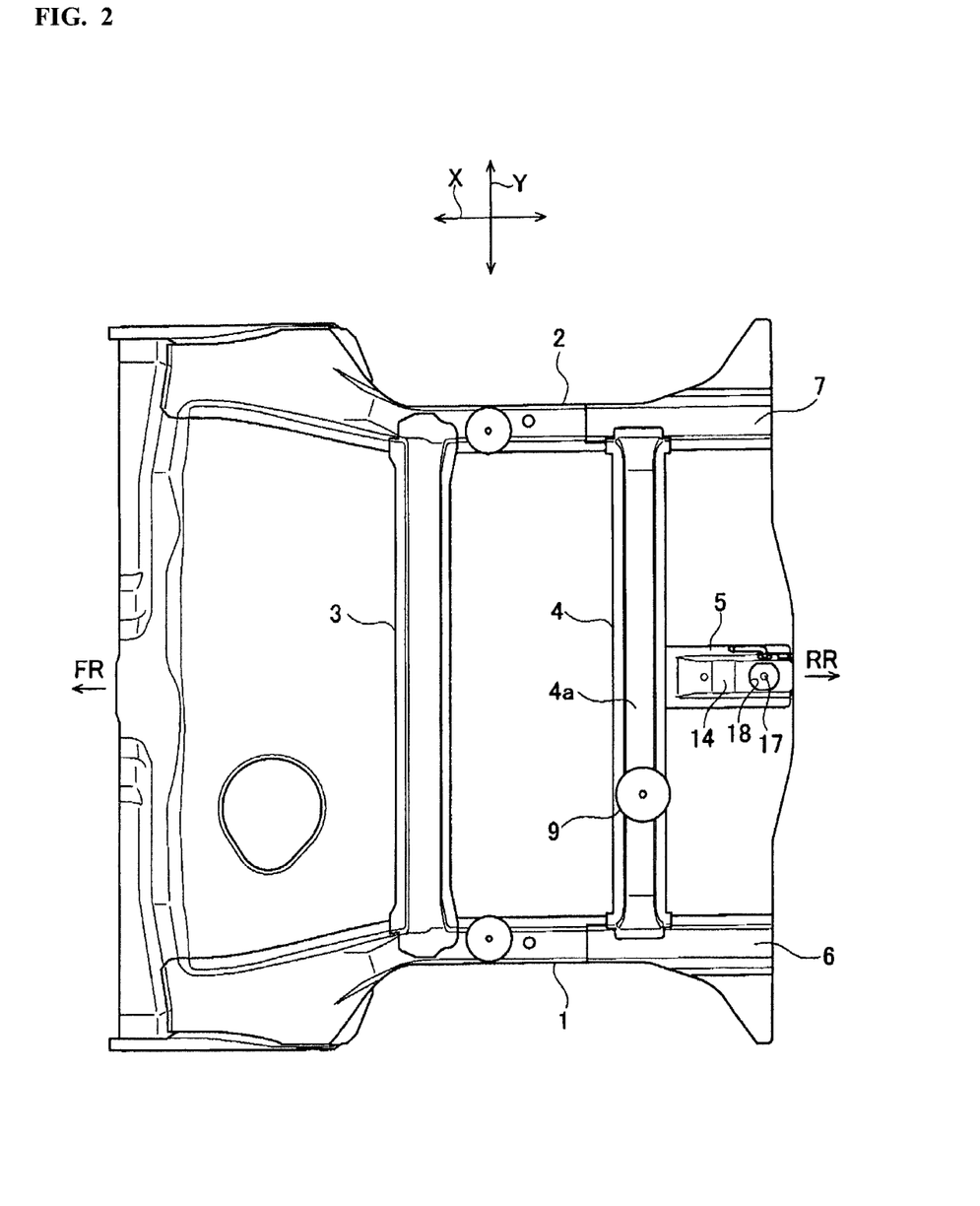
FIG. 2 is a bottom view of the rear structure shown in FIG. 1.
Figure 3:
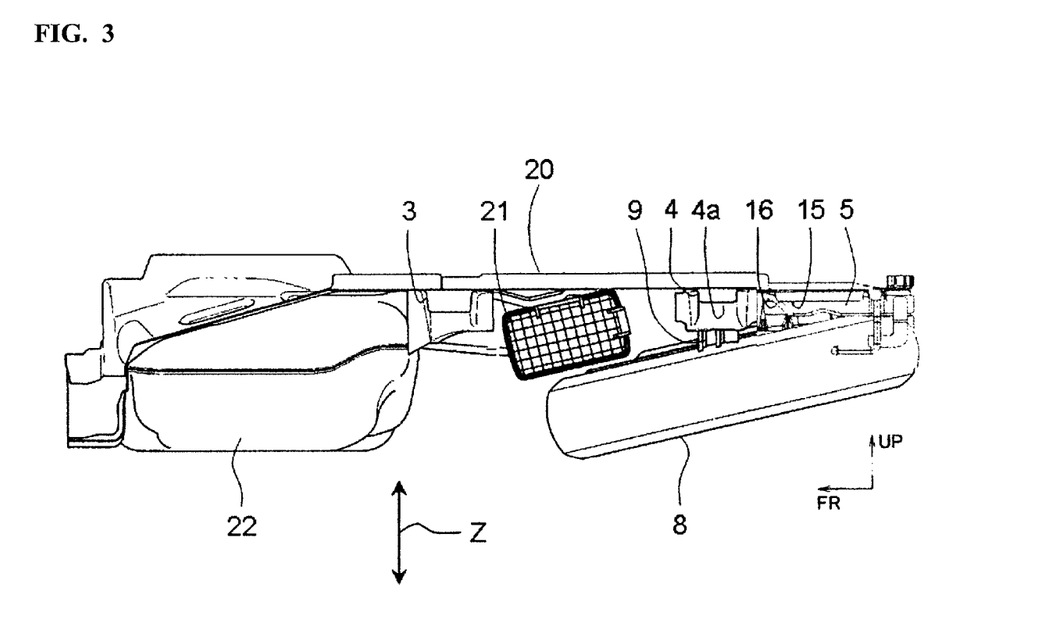
FIG. 3 is a side view of the rear structure shown in FIG. 1.

In FIG. 2, an axis X indicates a front-to-rear direction of the vehicle, while an axis Y indicates a width direction of the vehicle. Further, an arrow FR indicates a front direction of the vehicle, while an arrow RR indicates a rear direction of the vehicle. In FIG. 3, an axis Z indicates a height direction of the vehicle.

Figure 1:
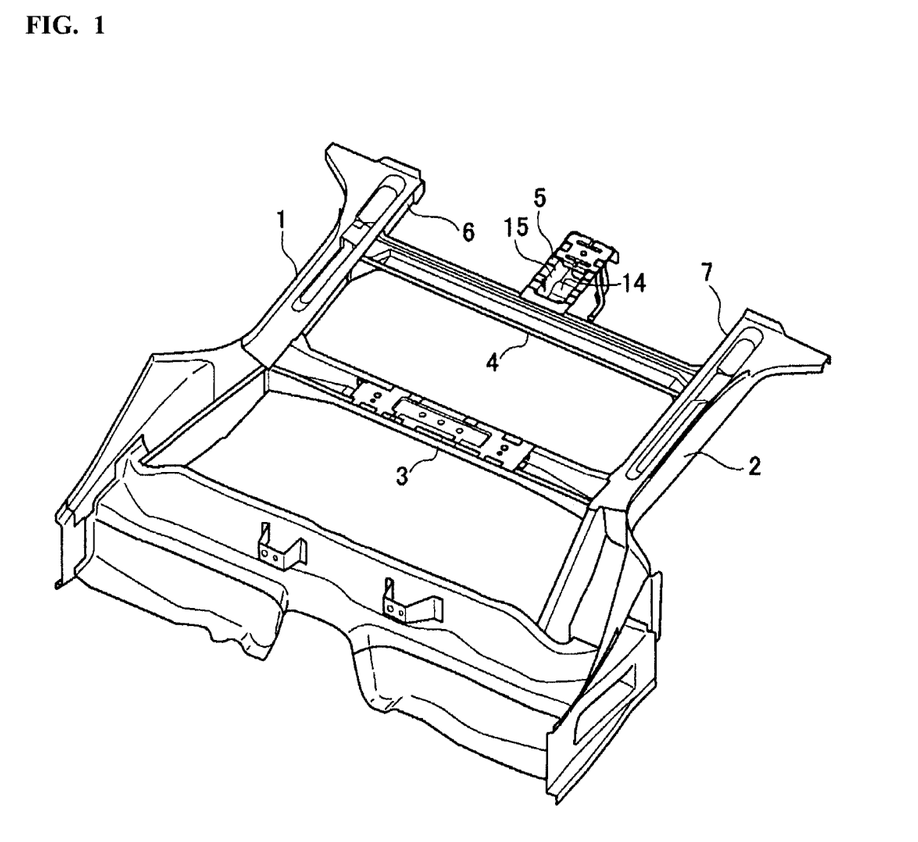
FIG. 1 is a perspective view of a rear structure of a vehicle body according to one embodiment of the present disclosure.

As shown in FIGS. 1 to 3, the rear structure of the vehicle body according to embodiments disclosed herein comprises a first rear side member 1, a second rear side member 2, a first rear cross member 4, a second rear cross member 3, and a rear center member 5.

The first rear side member 1 and the second rear side member 2 form a main framework of the rear portion of the vehicle and extend toward a rear direction RR of the vehicle. They are arranged at right and left sides by a desired distance in a width direction of the vehicle. Extension members 6 and 7 are respectively installed on rear distal ends of the first rear side member 1 and the second rear side member 2. The extension members 6 and 7 may be crushed when receiving the impact load to thereby absorb the impact energy.

In order to improve a rigidity of the rear portion of the vehicle, the second rear cross member 3 may be installed between the first rear side member 1 and the second rear side member 2 and extending in the width direction of the vehicle. The rigidity of the rear portion of the vehicle may be improved by connecting a first end of the second rear cross member 3 to the first rear side member 1 and a second end of the second rear cross member 3 to the second rear side member 2.

The first rear cross member 4 may be installed at a vehicle rear direction of the second rear cross member 3 and may be configured to connect the first rear side member 1 and the second rear side member 2. Namely, a first end of the first rear cross member 4 may be connected to the first rear side member 1 and a second end of the first rear cross member 4 may be connected to the second rear side member 2. The first rear cross member 4 may be substantially parallel to the second rear cross member 3 to thereby form the rear portion of the vehicle body in a ladder shape when viewed from above, as shown in FIGS. 1 and 2. A spare tire retaining member 9 for retaining a spare tire 8 may be installed at a lower surface 4a of the first rear cross member 4. The spare tire 8 may be retained by the spare tire retaining member 9 and a spare tire hanger (not shown) extended along the vehicle height direction.

Figure 5:
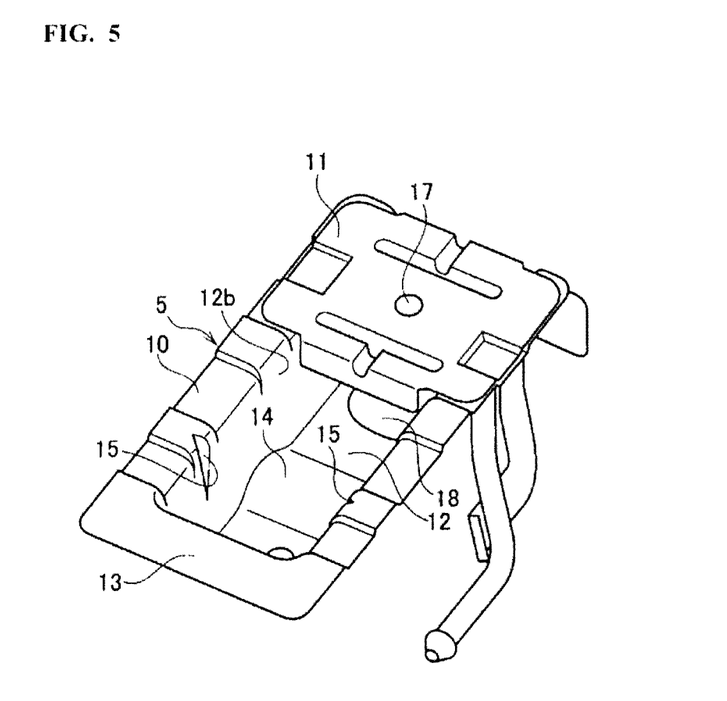
FIG. 5 is a perspective view of a rear center member.
Figure 6:
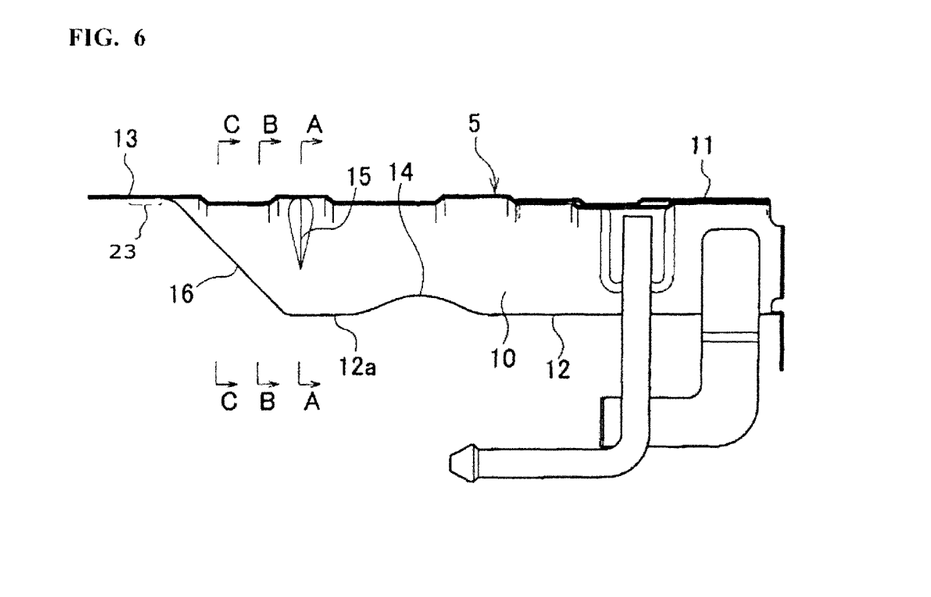
FIG. 6 is a side view of the rear center member.
Figure 7:
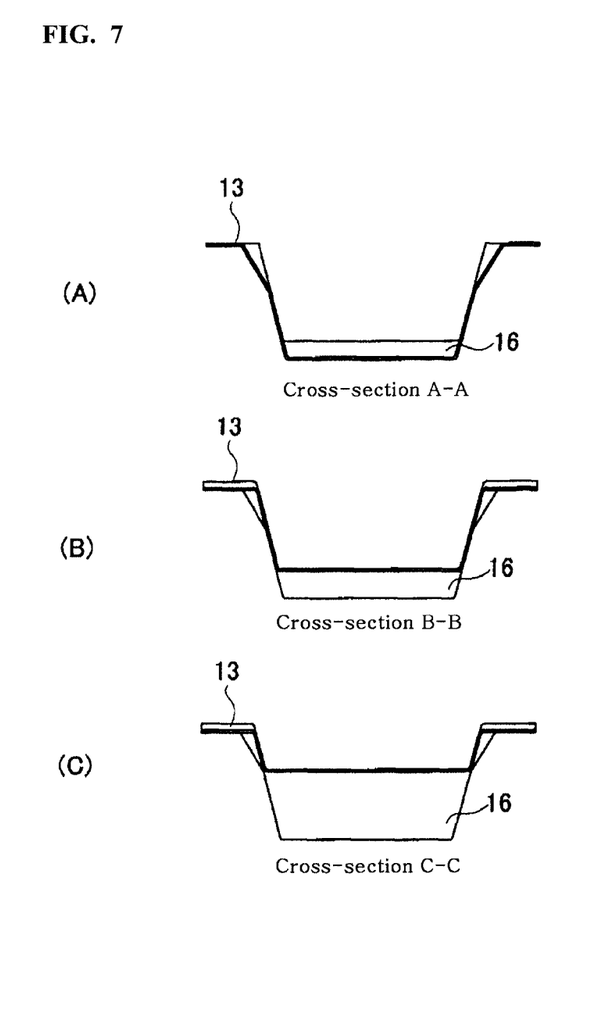
FIG. 7(A) is a cross-sectional view of each position taken along the line A-A shown in FIG. 6.
FIG. 7(B) is a cross-sectional view of each position taken along the line B-B shown in FIG. 6.
FIG. 7(C) is a cross-sectional view of each position taken along the line C-C shown in FIG. 6.

The rear center member 5 may be coupled to a vehicle rear side of the first rear cross member 4 between the first rear side member 1 and the second rear side member 2, and may be substantially parallel to such rear side members 1 and 2. As shown in FIGS. 5 to 7, the rear center member 5 may include a first member 10 and a second member 11. The first and second members, 10 and 11, may be coupled to surround an inner space to form at least a partially closed structure. Further, a plurality of sacrificial crumple zones may be formed in the rear center member 5. In certain embodiments, for example, the crumple zones may comprise beads, darts, embosses, ramps, ridges, bosses, or other similar structures.

Figure 4:
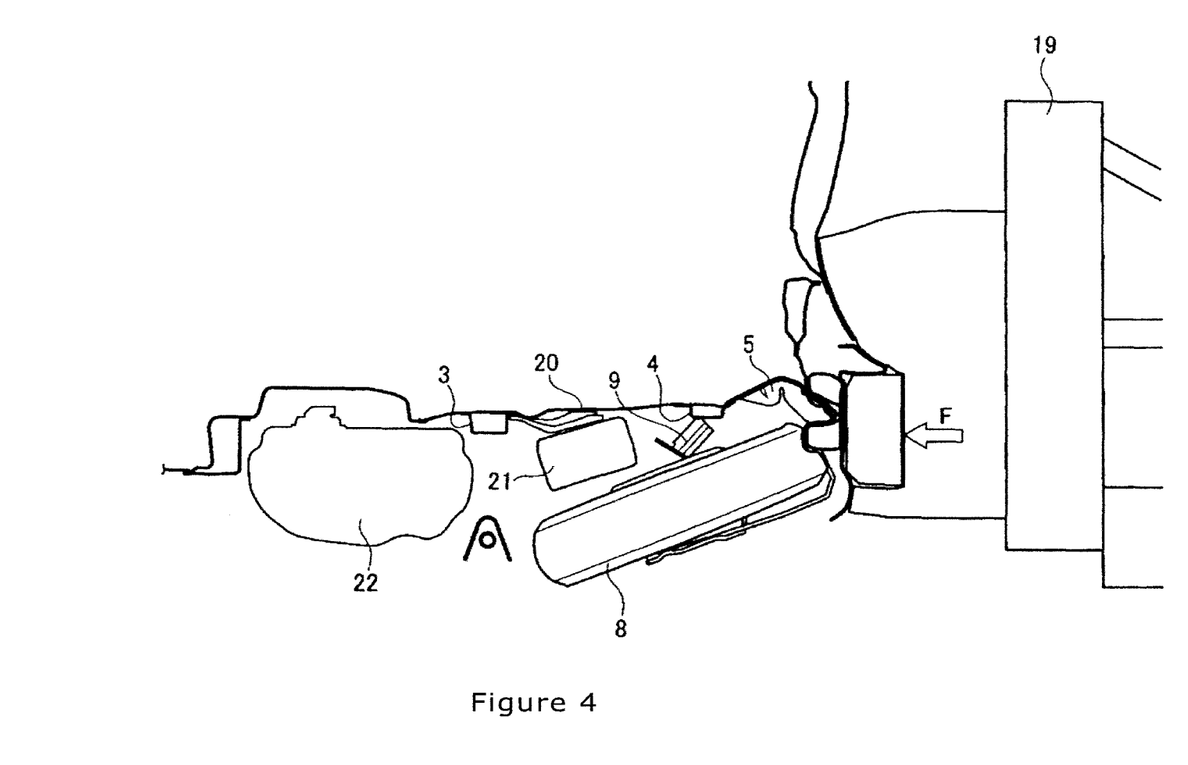
FIG. 4 is a side view of the rear structure when an impact load is exerted upon a rear portion of a vehicle.

Regardless of particular structure, the crumple zones may be configured to crumple (i.e., be crushed) when an impact load F is applied at the rear of the vehicle in a direction toward the front of the vehicle (e.g., FIG. 4). As such, the crumple zones are configured to absorb and dissipate the kinetic energy of the impact load in an attempt to prevent damage to other vehicle body components and to reduce the effect of the impact load upon passengers of the vehicle. Thus, crumple zones and components containing crumple zones may be referred to as "sacrificial" or "energy dissipating" components of the vehicle body structure.

Referring again to FIGS. 5-7, the first member 10 may include a body 12 and a flange 13. The body 12 may, for example, be formed into a concave shape by executing a pressing operation on a flat metal plate to be recessed in a lower direction of the vehicle and to have a substantially rectangular shape when viewed from above, and may include a bottom surface 12a and sidewall 12b at least partially surrounding the bottom surface 12a. The flange 13 may be formed at an upper and outer periphery of the body 12. A vulnerable (i.e., sacrificial or energy dissipative) structure may be formed on the body portion 12. In particular, the vulnerable structure may include a first crumple zone 14, which may be formed as a convex shape from a bottom surface 12a toward an upper direction of the vehicle and may extend across the body 12 in a width direction of the vehicle. The first crumple zone 14 may serve as a first crushable portion, which may be a starting point to be crushed by the impact load from the rear direction of the vehicle.

Further, the vulnerable structure of body 12 of rear center member 5 may include one or more second crumple zones 15, which may also serve as part of the first crushable portion. The second crumple zones 15 may be formed at an inner side wall 12b of the body 12 and may be formed at a position closer to the front direction of the vehicle than a position where the first crumple zone 14 is formed. The second crumple zones 15 may comprise a V-shape vertically elongated toward the bottom surface 12a and indenting the flange 13. As shown, a plurality of second crumple zones 15 may be formed at the inner side wall 12b, for example at opposing sides of the side wall 12b in the width direction of the vehicle. However, those having ordinary skill will appreciate that a vulnerable structure of body portion 12 of rear center member 5 may comprise one or more first crumple zones 14, one or more second crumple zones 15, or a combination thereof.

Further, a third crumple zone 16 may be formed at a coupling edge 23 of the rear center member 5. The third crumple zone 16 may be formed as a ramp inclined from the vehicle rear direction toward the coupling edge 23 in the vehicle upper direction and vehicle forward direction. As shown in FIGS. 7(A), 7(B), and 7(C), the cross-sectional area of the body 12 decreases when moving from the vehicle rear direction of the rear center member 5 toward the coupling portion 23. As shown in FIG. 6, a vehicle forward end of the first member 10 may be formed as the third crumple zone 16.

The coupling edge 23 between the first member 10 and the first rear cross member 4 may be formed with the flange 13 at a connecting side of the first member 10. The flange 13 may be welded or fixed to the first rear cross member 4.

In certain embodiments, the second member 11 may be sized to be about between ⅓ and ½ of the size of the first member 10, and may be installed in the vehicle rear direction of the first member 10. The second member 11 may be formed by executing a pressing operation on a flat metal plate in a desired shape and may be integrated by being overlapped and welded or secured to the flange 13 of the first member 10.

Through-holes 17 and 18 for a hook (not shown) for hanging one end of the spare tire hanger may be formed in the first and second members 10 and 11. The through-hole 18 formed in the first member 10 may be formed to be larger than the through-hole 17 formed in the second member 11. Because the larger through-hole 18 may be formed, the rigidity in this region may be weakened so that through-hole 18 may facilitate crushing of the rear center member 5 by the impact load.

As shown in FIG. 4, when an impactor 19 collides in a center collision from the rear direction toward the front direction of the vehicle with the impact load F, the impact load F may be exerted upon the extension members 6 and 7 of the first rear side member 1 and the second rear side member 2 and the rear center member 5 therebetween. A center collision means that the impactor 19 may impact the first rear side member 1, the second rear side member 2, and the rear center member 5. The extension members 6 and 7 may be crushed by the impact load F. Further, the rear center member 5 may crush (buckle) starting from the first crushable portion (first crumple zone 14 and second crumple zone 15), and may be initially crushed by impact load F.

Further, starting from the crushing of the first crushable portion (e.g., first crumple zone 14 and second crumple zone 15) a rear end region with the second member 11 may be crushed. Then, the second crushable portion (e.g., third crumple zone 16) may be crushed. Because the third crumple zone 16 may be formed from the ramp inclined from the bottom surface 12a of the body 12 in the upper direction of the vehicle toward the coupling edge 23, the third crumple zone 16 may buckle in a vehicle upper direction.

Therefore, the vehicle rearward end of the rear center member 5 may be pushed upward and caused to contact a floor panel 20 of the vehicle, causing the rear floor panel 20 to be pushed upward in the vehicle upper direction. The upward movement of the rearward end of the rear center member 5 may allow the impactor 19 to exert the impact load F upon the spare tire 8, which may then pivot about a spare tire retaining member 9 so that the rearward end of the spare tire 8 may be lifted upward while the forward end of the spare tire 8 may be pushed downward. Thus, contact and interference between the forward end of the spare tire and a canister 21, which may be located in the vehicle forward direction from the spare tire 8, may be avoided. Accordingly, a situation may be prevented in which the spare tire 8 and the canister 21 are pushed down to crush a fuel tank 22, which may be arranged in the vehicle forward direction from the spare tire 8 and canister 21.

As such, because the rear center member 5 may be crushed starting from the crushing of the first and second crushable portions, the impact energy by the impactor 19 may be absorbed by the rear center member 5. The impact load F, the energy of which may be absorbed and weakened because the rear center member 5 may be crushed, may be transferred via the first rear cross member 4 to the first rear side member 1 and the second rear side member 2 installed at both ends thereof. The impact load F may be decreased by a high rigidity region of the first rear side member 1 and the second rear side member 2 connected by the second rear cross member 3.

In the case of an offset collision, according to embodiments disclosed herein, because the rear center member 5 may be installed between the first rear side member 1 and the second rear side member 2 and may be substantially parallel to such rear side members 1 and 2, the impact load F may be exerted upon the rear center member 5 and one of the first rear side member 1 or the second rear side member 2 in an offset collision. As such, because the impact load F may be received by the rear center member 5 and one of the first rear side member 1 or the second rear side member 2, instead of only one of the rear side members 1 and 2, the situation may be avoided in which the rear side members 1 or 2 are bent to the inner side in the width direction of the vehicle. Thus the impact energy may be sufficiently absorbed.

As described above, according to embodiments disclosed herein, because the rear center member 5 may be installed between the first rear side member 1 and the second rear side member 2 and may be substantially parallel to such rear side members 1 and 2, the impact load F may be exerted upon the rear center member 5 and one of the rear side members 1 or 2. Thus, the impact energy may be effectively absorbed.

Further, according to embodiments disclosed herein, because the vulnerable structure, which may be crushed by the impact load F from the rear direction of the vehicle, may be installed or formed in the rear center member 5, when the impact load F may be impacted from the rear direction of the vehicle, the rear center member 5 may be crushed starting from the crushable portions to thereby sufficiently absorb the impact energy.

Additionally, according to embodiments disclosed herein, because it may be configured that the impact load F may be transferred via the first rear cross member 4 to the first rear side member 1 and the second rear side member 2 after the rear center member 5 may be crushed, the impact load F (the energy of which may be absorbed by the rear center member 5 and thus lessened) may be transferred to both rear side members 1 and 2.

Further, according to embodiments disclosed herein, because the vulnerable structure may be formed from the first crushable portion initially crushed by the impact load F and the second crushable portion crushed after the first crushable portion may be crushed, the impact energy may be sequentially absorbed and the rear center member 5 may be completely crushed to efficiently absorb the impact load F and may control transfer of the impact load F to both rear side members 1 and 2.

Also, according to embodiments disclosed herein, because the first crushable portion may comprise the first crumple zone 14 and the second crumple zone 15 at two locations of the rear center member 5, the first crushable portion may comprise a simple structure.

Further, according to embodiments disclosed herein, because the second crushable portion may comprise the third crumple zone 16, which may be formed as a ramp inclined from the vehicle rear direction of the vehicle toward the coupling edge 23 in the vehicle upper direction and vehicle forward direction, the second crushable zone may be effectively crushed.

Additionally, according to embodiments disclosed herein, because the third crumple zone 16 may be formed from the ramp inclined in the upper direction of the vehicle toward the coupling edge 23, the rear floor panel 20 may be dislocated as it may be pushed up in the vehicle upper direction by the impact load F. Thus, it may be avoided that the spare tire 8 and the canister 21 may be pushed down in the vehicle forward direction to crush the fuel tank 22.

Further, according to embodiments disclosed herein, because the vulnerable structure of the rear center member 5 may be crushed to push up the rear floor panel 20 toward the upper direction of the vehicle, the canister 21 and fuel tank 22 installed at the lower surface of the vehicle may be protected at the time of collision.

While the preferred embodiments of the present disclosure are described above, the present disclosure may include other embodiments and modifications without deviating from the subject matter or scope of the disclosure.

For example, the vehicle forward end of the third crumple zone 16 of the rear center member 5 may be fixed at the lower surface 4a of the first rear cross member 4 rather than at the upper surface. By doing so, the amount of energy absorbed by the rear center member 5 may be increased.

Advantageously, embodiments disclosed herein relate to providing a rear structure of a vehicle body wherein a rear side member may not bend toward the inner or outer side by the impact load from the rear of the vehicle even at the time of an offset collision, and wherein the rear structure is capable of sufficiently absorbing the impact energy therefrom.

Advantageously, a rear cross member may be installed at a rear direction of the vehicle. The rear cross member may connect a first rear side member and a second rear side member arranged at right and left sides in a width direction of the vehicle. Further, a rear center member may be connected to the rear cross member between the first and second rear side members, and substantially parallel to the rear side members.

Additionally, a vulnerable structure may be integrated into the rear center member. Advantageously, the rear center member may be installed between the first and second rear side members, and substantially parallel to the rear side members. Further, it may be connected to the rear cross member. Thus, an impact load may be exerted to a rear side member at any one side and the rear center member even at the time of an offset collision. Therefore, because the vulnerable structure crushed by the impact load may be formed in the rear center member, the rear center member may be crushed starting from the vulnerable structure to thereby sufficiently absorb the impact energy exerted upon the rear portion of the vehicle.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A rear structure of a vehicle body, comprising:
a first rear side member and a second rear side member, the first and second rear side members generally extending in a front-to-rear direction of the vehicle body;
a first rear cross member extending between the first rear side member and the second rear side member;
a rear center member extending from the first rear cross member toward the rear of the vehicle body in the front-to-rear direction; and
the rear center member comprising at least one structure configured to be vulnerable when an impact load is exerted upon the rear of the vehicle body,
wherein the vulnerable structure comprises:
a first crushable portion configured to be crushed by the impact load first; and
a second crushable portion configured to be crushed after the first crushable portion is crushed.

2. The rear structure of the vehicle body of claim 1, wherein the rear center member is substantially parallel to the first and second rear side members.

3. The rear structure of a vehicle body of claim 1, further comprising:
a first extension member extending vehicle rearward beyond the first rear cross member from the first rear side member; and
a second extension member extending vehicle rearward beyond the first rear cross member from the second rear side member.

4. The rear structure of a vehicle body of claim 1, further comprising a second rear cross member extending between the first rear side member and the second rear side member and positioned forward of the first rear cross member.

5. The rear structure of a vehicle body of claim 1, wherein:
the rear center member comprises a bottom surface and a side wall at least partially surrounding the bottom surface; and
the first crushable portion comprises a first crumple zone formed in the bottom surface and a second crumple zone formed in the sidewall.

6. The rear structure of a vehicle body of claim 1, wherein the second crushable portion is disposed forward of the first crushable portion in the front-to-rear direction of the vehicle body.

7. The rear structure of a vehicle body of claim 6, wherein the second crushable portion comprises a reduced cross-sectional area.

8. The rear structure of a vehicle body of claim 7, wherein the second crushable portion comprises a ramp inclined upward and forward in the front-to-rear direction.

9. The rear structure of a vehicle body of claim 1, wherein the vulnerable structure is configured to crush into a rear floor panel of the vehicle when the impact load is exerted upon the rear of the vehicle body.

10. The rear structure of a vehicle body of claim 1, wherein the vulnerable structure of the rear center member comprises at least one emboss.

11. The rear structure of a vehicle body of claim 1, wherein:
the vulnerable structure is disposed at a coupling portion of the rear center member with the first rear cross member and comprises a portion of reduced cross-section between a starting point at the coupling portion and a bottom surface of the rear center member, and
the starting point is positioned vehicle rearward of the coupling portion in the front-to-rear direction.

12. The rear structure of a vehicle body of claim 11, wherein the portion of reduced cross-section is inclined upward and forward in the front-to-rear direction.

13. A rear structure of a vehicle body, comprising:
a first rear side member and a second rear side member, the first and second rear side members generally extending in a front-to-rear direction of the vehicle body;
a first rear cross member extending between the first rear side member and the second rear side member;
a rear center member extending from the first rear cross member toward the rear of the vehicle body in the front-to-rear direction; and
the rear center member comprising a means for collapsing configured to be crushed when an impact load is exerted upon the rear of the vehicle body,
wherein the means for collapsing comprises:
a first crushable portion configured to be crushed by the impact load first; and
a second crushable portion configured to be crushed after the first crushable portion is crushed.

14. The rear structure of a vehicle body of claim 13, wherein the first and second rear side members comprise means for extending the first and second rear side members toward the rear of the vehicle in the front-to-rear direction.

15. The rear structure of a vehicle body of claim 13, wherein the means for collapsing comprises at least one emboss.

16. A method to absorb an impact to a rear structure of a vehicle body, comprising:
disposing first and second rear side members in a front-to-rear direction to the vehicle body;
extending a first rear cross member between the first and second rear side members;
extending a rear center member from the first rear cross member toward the rear of the vehicle body in the front-to rear direction; and
providing at least one crushable portion to the rear center member, wherein the at least crushable portion is configured to be crushed by an impact load applied to the rear structure of the vehicle body,
wherein the at least one crushable portion comprises:
a first crushable portion configured to be crushed by the impact load first; and
a second crushable portion configured to be crushed after the first crushable portion is crushed.

17. The method of claim 16, wherein the crushable portion is configured to crush into a rear floor panel of the vehicle when the impact load is applied to the rear of the vehicle body.

18. The rear structure of the vehicle body of claim 1, wherein the rear center member extends from the first rear cross member toward the rear of the vehicle body in the front-to-rear direction beyond rear ends of the first rear side member and the second rear side member.

19. The rear structure of the vehicle body of claim 13, wherein the rear center member extends from the first rear cross member toward the rear of the vehicle body in the front-to-rear direction beyond rear ends of the first rear side member and the second rear side member.

20. The method of claim 16, wherein the rear center member extends from the first rear cross member toward the rear of the vehicle body in the front-to-rear direction beyond rear ends of the first rear side member and the second rear side member.

* * * * *